United States Patent [19]
Paxton

[11] 3,815,806
[45] June 11, 1974

[54] DESOLDERING FIXTURE

[75] Inventor: Roy S. Paxton, Hasbrouck Heights, N.J.

[73] Assignee: The Singer Company, Little Falls, Ohio

[22] Filed: Nov. 24, 1972

[21] Appl. No.: 309,340

[52] U.S. Cl. ........................ 228/19, 228/40, 228/56
[51] Int. Cl. .............................................. B23k 1/00
[58] Field of Search ............. 228/19, 33, 36, 40, 56; 29/426, 503; 118/400

[56] References Cited

UNITED STATES PATENTS

| | | | |
|---|---|---|---|
| 3,039,185 | 6/1962 | Oates | 118/400 X |
| 3,058,441 | 10/1962 | Walker et al. | 228/33 |
| 3,385,262 | 5/1968 | Jaeke et al. | 228/56 X |
| 3,629,543 | 12/1971 | Mayhew et al. | 228/40 X |
| 3,684,151 | 8/1972 | Burman et al. | 228/19 |
| 3,731,866 | 5/1973 | Mason et al. | 228/33 X |
| 3,732,063 | 5/1973 | Corsaro | 29/503 X |

*Primary Examiner*—J. Spencer Overholser
*Assistant Examiner*—Robert J. Craig
*Attorney, Agent, or Firm*—T. W. Kennedy

[57] ABSTRACT

A fixture is described herein which is suitable for soldering or desoldering multiple electrical connections as might be found on a printed circuit board or on a printed wiring tape. The disclosure includes in combination a container made from a non-wetting material such as 303 Stainless Steel, connected to a source of heat such as a standard soldering iron or small solder pot. The container includes a cavity into which the solder is placed. This cavity is surrounded by a reservoir ledge which acts to restrain the overflow of solder when the leads to be soldered or unsoldered are immersed therein.

5 Claims, 4 Drawing Figures

DESOLDERING FIXTURE

BACKGROUND OF THE INVENTION

This invention relates in general to fixtures which can be used for soldering and desoldering electrical contacts, but in particular to a fixture which can operate on these contacts simultaneously.

In today's highly complex and tightly packaged electronic component assemblies, it has become increasingly difficult to quickly assemble and/or repair these component boards. In particular, the lead count on certain of the electrical components used in today's advanced electronic assemblies, such as electrical components or integrated circuits, it becomes extremely time consuming to solder or unsolder each of the component leads to thereby effect component removal. (Insert a reference to note the fact that what will be said for desoldering will likewise pertain to soldering unless otherwise specified.) In addition to the time consumed in removing these components, an additional factor which warrants improved desoldering fixture concerns the salvaging of the removed component, assuming that it is a failed component, to thereafter facilitate a reliability analysis of the failure mechanism.

Present day techniques include the application of heat through the well known soldering iron to a single lead, together with the placement of a wicking-type material such as a metallic braid to draw off the solder once it has been heated. The heated solder may also be removed by sucking it off with a vacuum pump. This usually requires multiple attempts to withdraw the solder from each one of the component leads with no good assurance that the lead has been completely stripped of the solder. With the continuous application of heat from the soldering iron to the electrical connection, the printed circuit lands, or top of the board in particular, to which the lead is secured by solder, often times lifts from the glass board to which the printed circuit lands are attached. Thus, the reliability of the board is further decreased, until some time it may be completely unusable under the stringent requirements of high reliability, military programs. High scrappage costs result.

The prior art has attempted to deal, in a limited way, with this problem. Such a design is disclosed in U.S. Pat. No. 3,084,649. This approach relies on utilization of what would appear to be an expensively machined fixture which would have to be configured for each particular component sought to be removed. Additionally, the approach described therein would appear to be somewhat impractical in light of today's reality of extremely dense electronic packages where the spacing between leads on a printed circuit (PC) board has become very much closer. Further, U.S. Pat. No. 3,084,649 dismissed a signal bath approach, which is part of the applicant's invention, due to the scorching of printed circuit boards and the dangerous aspect of solder spillage.

Due to improvements in printed circuit board construction and better controlled soldering temperatures, the problem of board scorching has been to a large extent minimized. Additionally, applicant's particular configuration has proven to be suitable to avoid solder spillage.

SUMMARY OF THE INVENTION

Therefore, it is an object of this invention to provide a fixture which can be used to solder or desolder multiple electrical connections, wherein a single molten solder bath is employed.

It is a further object of this invention to provide an improved fixture comprised of a non-wetting material.

It is still another object of this invention to provide a fixture with a ledge surrounding the solder bath, to thereby restrain the lateral movement of the molten bath when the component leads to be worked upon are inserted therein.

Described hereinafter is a fixture suitably adapted for connection to standard soldering irons or solder pots. The fixture is manufactured from a non-wetting material and is configured to have a single cavity therein, said cavity being adapted to contain a molten solder bath. The outline of the cavity is such as to approximately reflect the lead pattern of the electrical component to be desoldered. Further, the cavity is surrounded by a relief reservoir ledge which acts to restrain the lateral movement of the molten solder when the printed circuit board is immersed therein.

DESCRIPTION OF A PREFERRED EMBODIMENT

Figure 1:
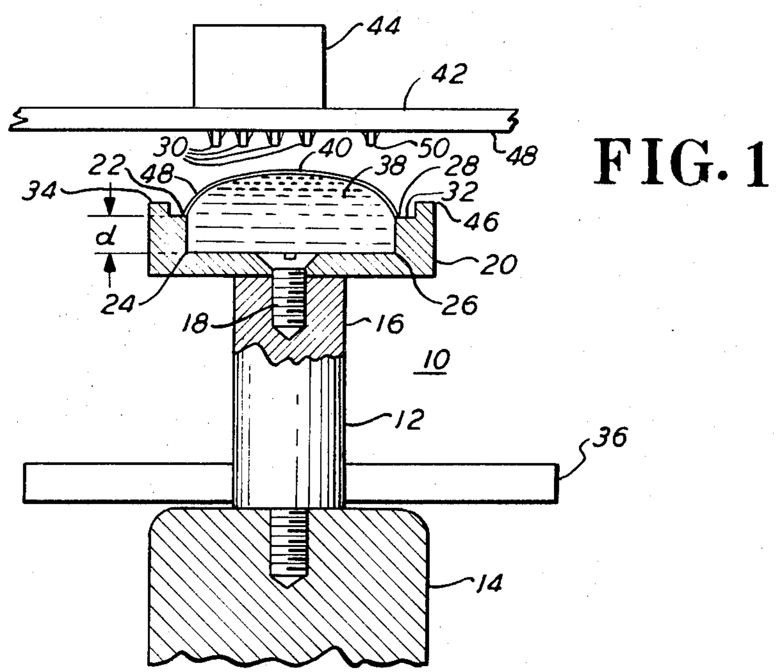
FIG. 1 is a sectional, elevation view of invention.

Referring to FIG. 1, we have shown the combination 10, which forms the essence of this invention. Stem 12, which is made from a thermally conductive material such as copper, is secured in any known fashion to a heat source 14, which may be a standard soldering iron or solder pot. The upper end 16, has an internal thread suitable for receiving screw 18. Positioned on the flat surface of upper end 16 is a container 20. Container 20 is made from a suitable non-wetting material, i.e., solder will not adhere thereto, such as 303 Stainless Steel or other suitable material. Container 20 is secured to the upper end 16 of stem 12 by means of screw 18, which also is fabricated from a suitable non-wetting material.

Container 20 is cast or machined to have a cavity, defined by points 22, 24, 26 and 28. The depth of the cavity *d*, must be suitable to allow for the longest soldered component lead 30 which will be desoldered. Additionally, where the distance between the center line of stem 12 and the furthest extremity of the cavity becomes relatively large, it has been found desirable to increase the depth of the cavity d beyond this minimum requirement to a depth suitable to minimize the temperature gradient across the surface of the solder. This results due to the fact that the additional molten solder provides an excellent heat transfer mechanism from the stem 12 to the extremeties of the cavity. Further, a consideration which must be given to the depth of the cavity, is the need to provide a suitable heat source found in the volume of molten solder, sufficient to compensate for the amount of heat absorbed by the printed circuit board and component so that the temperature of the molten solder remains at a level suitable to cause the flow of the solder on component leads 30.

A rimmed ledge 32 is contiguous to the cavity. The height of the rim 34 is sufficient to restrain the dispersement of the molten solder upon insertion of the component leads 30 into the molten bath. The width of the ledge 32 preferably does not exceed that required to insure that the molten solder completely return to the cavity upon removal of the printed circuit leads 30 from the bath.

In order to protect the operator as well as the heat source 14 and working area, from accidental spillage, a protective shield 36, is preferably press fitted over stem 12. This shield 36 is made from a suitably, heat insensitive material such as commercially available TEFLON.

In operation, a suitable amount of solder preferably without a flux core, is placed in the cavity. The heat source 14 is then brought up to a suitable operating temperature sufficient to melt the solder and bring the molten solder 38 up to an operating temperature of approximately 450°F. Because of the fact that the container 20 is made from a non-wetting material, the solder 38 is repulsed by the metal which makes up the container 20. Consequently, the solder 38 takes the convex upward shape depicted in FIG. 1. Sufficient solder is added to insure that the upper surface 40 of the molten solder 38 rises above the top of rim 34.

Figure 3:
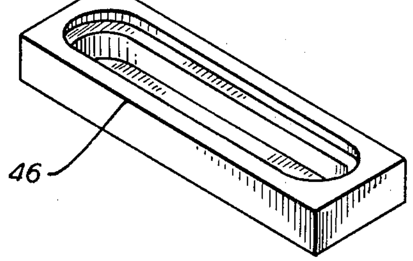
FIG. 3 is a plan view of a particular arrangement of the cavity which forms part of the invention.

The printed circuit board 42 with electrical component 44 soldered thereto is first laid against the outside edge 46 (as best illustrated in FIG. 3) at an oblique angle to the horizontal as viewed in FIG. 1. The board is thereafter slowly lowered such that the plane of the board 42 approaches the horizontal. This eases the component leads 30 into the molten solder 38, to thereby minimize spillage and to allow for the escapement of any air which might be sandwiched between the underside 48 of the printed circuit board 42, and the upper surface 40 of molten solder 38. The molten solder 38 is temporarily displaced into the volume formed by the ledge 32 and rim 34. The board is held in place, a sufficient time to enable the reflowing of the solder on component leads 30. At a suitable time thereafter the solder securing the component 44 to the printed circuit board 42 is sufficiently fluid to allow for the easy removal of component 44. After removal of the component, the board 42 is lifted from the solder bath. Because the container is made from a non-wetting material, which repulses any adhesion by the solder 38, the solder which has been displaced into the ledge area returns to the molten mass in the cavity portion of the container.

It has been found desirable to add a soldering fluid 48 to the surface 40 of molten solder 38. This prevents a solder bridging between the printed circuit conductors which are immersed in the molten solder 38. This fluid 48 may be commercially available PEBLUM A oil manufactured by the Shell Oil Company or No. 225 oil manufactured by the Hollis Engineering Company. In addition to preventing the bridging of printed circuit conductors by solder, this oil facilitates the reflow of solder on component leads such as 50, which are not required to be desoldered for component removal. This results in a suitable solder connection being maintained between the component lead and the surrounding printed circuit conductor.

When the fixture 10 is used as a soldering tool, the component board 42 with the components to be soldered mounted thereon is manipulated into the solder bath 38 in much the same manner as mentioned above. To facilitate the soldering of the leads (the soldering fluid also prevents the oxidation of the molten solder 38 to thereby prevent the formation of a slag at the surface) the area to be soldered may be pre-treated with a flux in addition to the use of solder fluid 48 upon the surface of the molten solder.

Figure 2:
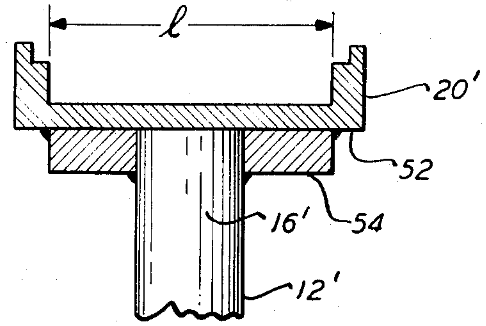
FIG. 2 is a sectional, elevation view of a modification to the basic invention.
Figure 4:
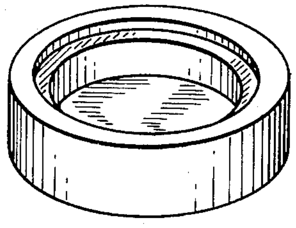
FIG. 4 is a plan view of another arrangement of the cavity which forms part of this invention.

Referring to FIG. 2, an alternate construction for the fixture involves securing to the underside 52 of the container 20' a bar of relatively good, thermally conductive material 54, such as copper. This piece of material is braised to the underside 52 and to the upper end 16 prime of stem 12'. This alternate construction may be used where the breadth of the cavity is such that the thermal gradients across the surface of the molten solder from a point on the center line of stem 12' to the edge of the cavity, is such that insufficient heat is available, at the extremities of the cavity to cause the solder surrounding a particular component lead at that point to flow. This is an alternate approach to that mentioned above wherein the depth of the cavity was increased to provide the additional heat transfer. FIGS. 3 and 4 are simple plan views of particular containers which may be configured to implement the principals of this invention.

It can also be appreciated that changes in the above embodiments can be made without departing from the scope of the present invention, and that other variations of the specific construction can be made by those skilled in the art without departing from the invention as defined in the appended claims.

I claim:

1. Apparatus for aiding an operator in removing or applying solder to a multiple electrical connection comprising in combination: a non-wetting container means having a cavity therein said cavity having a lower portion of a first cross-sectional area for containing solder and an upper portion of a larger cross-sectional area to act as a reservoir means for restraining the lateral movement of solder, said container being filled with solder such that when not operated solder is not present in the upper portion of said cavity which acts as reservoir means; heat source means comprising a standard soldering iron; stem means interconnecting said heat source means and said container means; and a protective shield placed about said stem means, said protective shield avoiding the effects of solder spillage.

2. The apparatus of claim 1 wherein said Container means is made from 303 Stainless Steel.

3. The apparatus of claim 2 which further includes a layer of soldering fluid deposited over said solder to thereby facilitate reflow and to avoid bridging of said solder.

4. The apparatus of claim 3 wherein said cavity is of sufficient depth to maintain the temperature gradient across the surface of said solder at a level such that the temperature of the solder at the extremeties of said cavity are sufficient to maintain the solder in a molten state.

5. The apparatus of claim 3 which further includes a bar of relatively good thermal conductivity interposed between said stem means and said container to thereby minimize the thermal gradient across the surface of the solder.

* * * * *